US008166998B2

(12) United States Patent
Clappison

(10) Patent No.: US 8,166,998 B2
(45) Date of Patent: May 1, 2012

(54) MULTIPLE VALVE ASSEMBLY FOR REDUCING WATER LOSS FROM A LEAK

(75) Inventor: Peter Clappison, Victoria (AU)

(73) Assignee: Pollectric International Pty Ltd, Croydon (AU)

( * ) Notice: Subject to any disclaimer, the term of this patent is extended or adjusted under 35 U.S.C. 154(b) by 398 days.

(21) Appl. No.: 12/520,771

(22) PCT Filed: Dec. 21, 2007

(86) PCT No.: PCT/AU2007/001984
§ 371 (c)(1),
(2), (4) Date: Sep. 17, 2009

(87) PCT Pub. No.: WO2008/074090
PCT Pub. Date: Jun. 26, 2008

(65) Prior Publication Data

US 2010/0012561 A1 Jan. 21, 2010

(30) Foreign Application Priority Data

Dec. 21, 2006 (AU) ................................ 2006907265

(51) Int. Cl.
*F16K 17/02* (2006.01)
*B01D 35/147* (2006.01)

(52) U.S. Cl. ........ 137/460; 137/613; 210/100; 210/110; 210/119

(58) Field of Classification Search .................. 137/628, 137/613, 460, 498; 210/100, 110, 119
See application file for complete search history.

(56) References Cited

U.S. PATENT DOCUMENTS 4,522,229 A 6/1985 Van de Moortele
5,794,653 A * 8/1998 DeSmet et al. ............... 137/486
6,939,470 B2 * 9/2005 Baarman et al. .............. 210/739
2004/0103927 A1 6/2004 Ha

FOREIGN PATENT DOCUMENTS

CA 2 307 351 A1 10/2001
DE 29 43 536 A1 5/1981
JP 2003-121295 A 4/2003

OTHER PUBLICATIONS

International Search Report issued in PCT/AU2007/0001984, mailed on Feb. 20, 2008, 4 pages.

* cited by examiner

*Primary Examiner* — Terry Cecil
(74) *Attorney, Agent, or Firm* — Osha • Liang LLP

(57) ABSTRACT

A valve assembly for reducing water loss from a leak from a water device. The valve assembly includes a first passage through which water flows from a water source to the water device and a second passage through which water flows from the water device. A first valve is in fluid communication with the first passage and the second passage. The first valve is operable for obstructing the first passage in response to a change in pressure differential between water in the first passage and water in the second passage resulting from a leak of water from the water device. The valve assembly also includes a second valve in fluid communication with the first passage. The second valve is responsive to the obstruction of the first passage to close the first passage and thereby stop water from flowing from the water source to the water device.

21 Claims, 8 Drawing Sheets

MULTIPLE VALVE ASSEMBLY FOR REDUCING WATER LOSS FROM A LEAK

The present invention relates to valve assemblies for use with water devices. The present invention is particularly suitable for use with water filtration devices and shall be described below in that context, however, it is to be understood that the invention may have broader use in relation to other water devices.

BACKGROUND

Typical domestic water filtration devices incorporate either a carbon or reverse osmosis water filter for filtering contaminants from water supplied from a mains water supply. Mains water typically enters the device via an inlet and is directed from the inlet through a filter. After passing through the filter the water exits the device through an outlet.

Valve assemblies are typically installed between the mains water supply and the water filtration device. Usually such valve assemblies incorporate at least one check valve, also known as a non-return valve, to prevent back flow of water from into the mains water supply and to prevent contamination thereof.

Between the inlet and the outlet of the water filtration device there is a system of piping and filter structures. From time to time, such devices may suffer a leak either through a faulty connection between pipes or through a rupture in a component of the filter itself. Water leaking from the device can cause damage in the surrounding area and can lead to significant wastage of water.

The above discussion of acts, materials, devices, articles and the like is included in this specification solely for the purpose of providing a context for the present invention. It is not suggested or represented that any of these matters are known, form part of the prior art base or are common general knowledge in the field relevant to the present invention at the priority date of each claim of this application.

SUMMARY OF THE INVENTION

The present invention seeks to ameliorate the problem of water leaking from a water device, such as a water filtration device, by providing a valve assembly for reducing water loss from a leak from a water device, the valve assembly including:

a first passage through which water flows from a water source to the water device;

a second passage through which water flows from the water device;

a first valve in fluid communication with the first passage and the second passage, wherein the first valve is operable for obstructing the first passage in response to a change in pressure differential between water in the first passage and water in the second passage resulting from a leak of water from the water device, and a second valve in fluid communication with the first passage that is responsive to the obstruction of the first passage to close the first passage and thereby stop water from flowing from the water source to the water device.

The invention is advantageous in that it includes both first and second valves that are operable for detecting a leak of water from a water device, such as a water filter, and that are operable for stopping the leak of water by stopping the flow of water to the device. The invention is also advantageous in that the first valve is operable for continuously monitoring the water device for leaks by being continuously subjected to the pressure differential between water flowing to the water device and water flowing from the water device and detecting a leak by detecting a change in the pressure differential therebetween. The invention is also advantageous in that whilst the first valve may detect the leak and obstruct the flow of water to the water device, and incidentally the second valve, the second valve is responsive to the obstruction for stopping the flow of water to the water device. Thus, the second valve ensures that the leak of water from the water device is limited and cannot resume even if the pressure differential between water flowing to the water device and water flowing from the water device detected by the first valve is reversed such as by a gradual change in the pressure of water in the first passage or in the second passage. Whilst there may be a range of reasons why the pressure of water in the first passage or in the second passage may change gradually over time the second valve ensures that the leak will not resume despite the gradual change in pressure. In other words, if the second valve were not present then the leak from the water device could resume as a result of a gradual change in the pressure of water in the first passage or the second passage that allows the first valve to reopen or unobstruct the first passage and allow water to flow to the water device from the water source.

In one form, the second valve includes a hollow body and a first opening through which water flows into the hollow body, a second opening through which water flows out of the hollow body and a closure that is responsive to a reduction in the volume of water in the hollow body for closing the second opening.

In another form, the reduction in volume of the water in the hollow body causes the closure to move from a position not between the first and second openings to a position between the first and second openings and into sealing engagement with the second opening thereby closing the second valve.

The hollow body may be cylindrical and have a top, a bottom and at least one side. The first opening may be located in the side of the hollow body at a point intermediate the top and the bottom. The second opening may be located in the bottom of the hollow body.

In one form, the assembly further includes a third passage for water to flow from the water source and through the second opening of the second valve to reset the second valve by forcing the closure out of sealing engagement with the second opening and moving the closure from the position between the first and second openings to the position not between the first and second openings.

The assembly may include a resetting valve that is operable by a user for selectively allowing the flow into the hollow body through the third passage and the second opening.

In one form, the assembly includes an air inlet check valve for allowing air to enter the second valve and prevent a vacuum forming in the second valve when the second valve responds to the obstruction of the first passage to close the first passage.

In another form, the assembly includes a water inlet check valve for allowing water to enter the second valve and prevent a vacuum forming in the second valve when the second valve responds to the obstruction of the first passage to close the first passage.

In yet another form, the assembly may further include a bleed passage for selectively bleeding air from the second valve.

The assembly may include a valve that is operable by a user for selectively opening the bleed passage.

In another form, the assembly may include a valve that is operable by a user for selectively allowing water to flow from the water source and into the hollow body of the second valve via the first opening.

The first valve may include a first chamber in fluid communication with the first passage and a second chamber in fluid communication with the second passage.

The first valve may be operable for closing the first chamber in response to a change in pressure differential between water in the first chamber and water in the second chamber resulting from a leak suffered by the water device.

The first valve may include at least one check valve in the second passage upstream from the second chamber for maintaining the pressure of water in the second chamber when the water device suffers a leak.

The first valve may have at least one diaphragm for sensing the pressure of water in the first passage and the first valve may have at least one diaphragm for sensing the pressure of water in the second passage.

In one form, the assembly includes at least two check valves in the first passage or in the second passage.

In other forms, the water device may be a water filter and the valve assembly may be encased within a housing.

In yet another form the invention includes a water filtration system including any of the above forms of the valve assembly, the water filtration system including a water filter for filtering water flowing from a water source through the first passage of the valve assembly and a water outlet to which filtered water flows from the filter through the second passage of the valve assembly.

the water outlet may be selectively openable for allowing water to flow from the water source to the water filter and to allow filtered water to flow from the water filter and out of the water outlet.

BRIEF DESCRIPTION OF THE DRAWINGS

It will be convenient to hereinafter describe the invention in detail with reference to the attached drawings illustrating a preferred embodiment of a valve assembly according to the invention. It should be appreciated, however, that the generality of the preceding portion of the specification is not to be superseded by the specifics of the following description.

DETAILED DESCRIPTION

Figure 1:
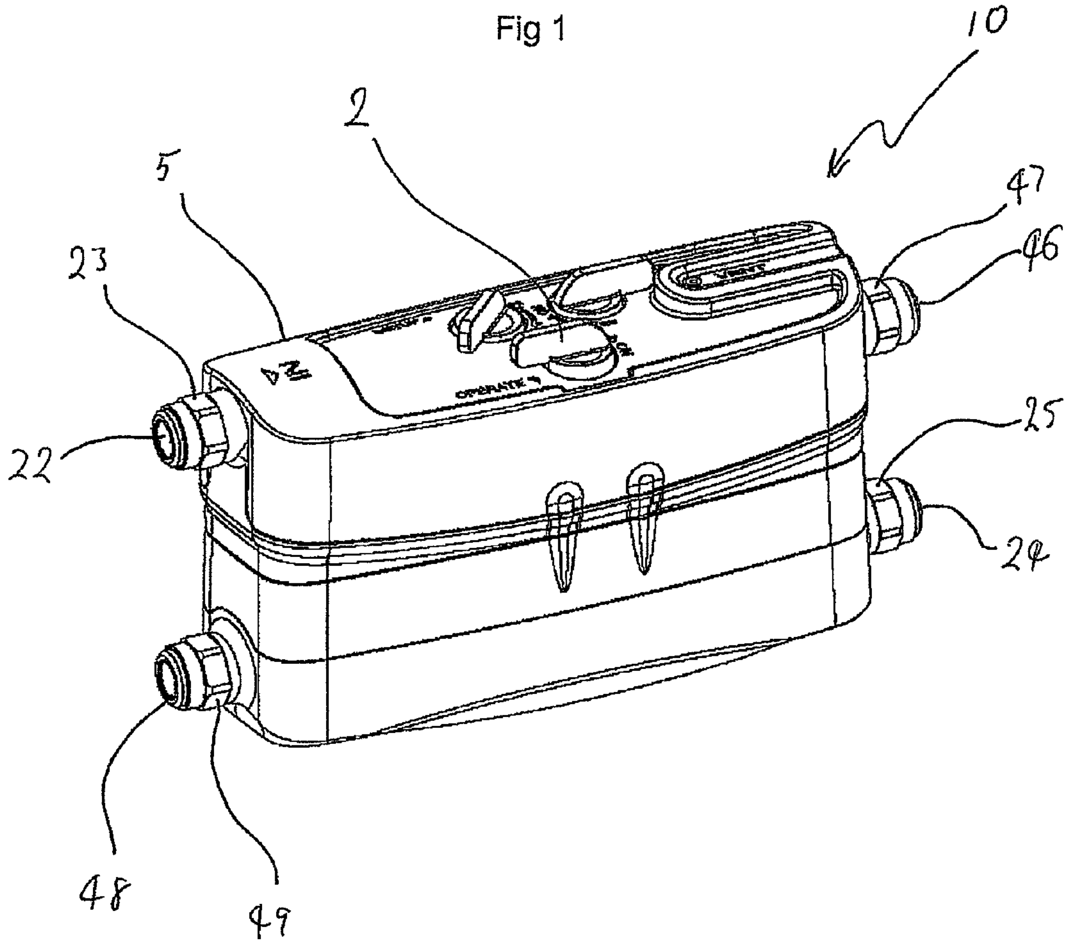
FIG. 1 illustrates a perspective view of a preferred embodiment of a valve assembly according to the invention.
Figure 2:
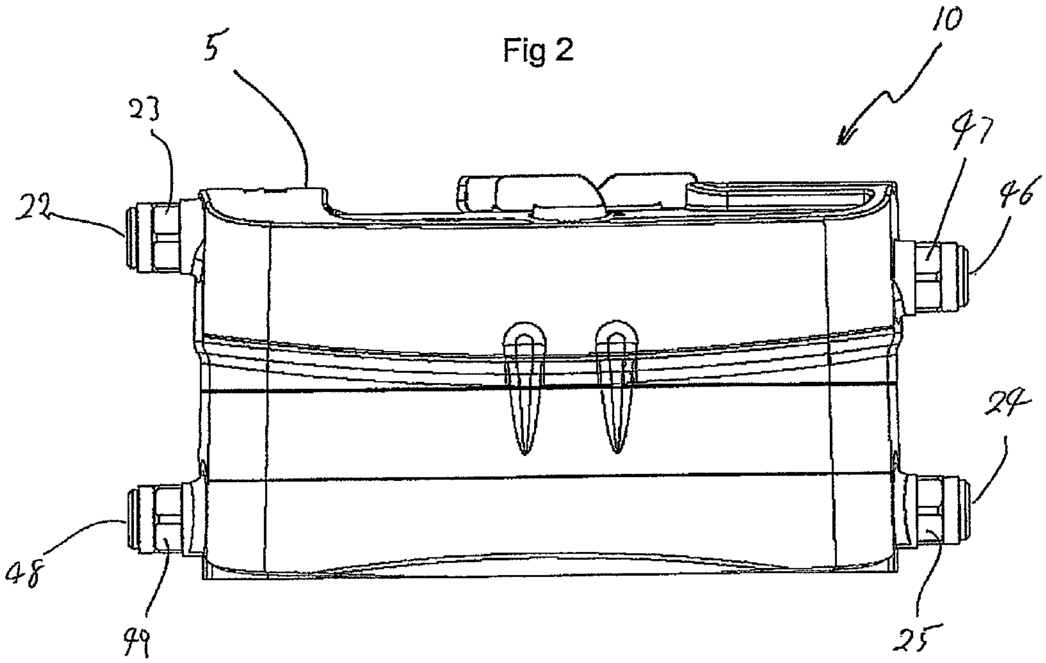
FIG. 2 illustrates a side view of the valve assembly of FIG. 1.
Figure 3:
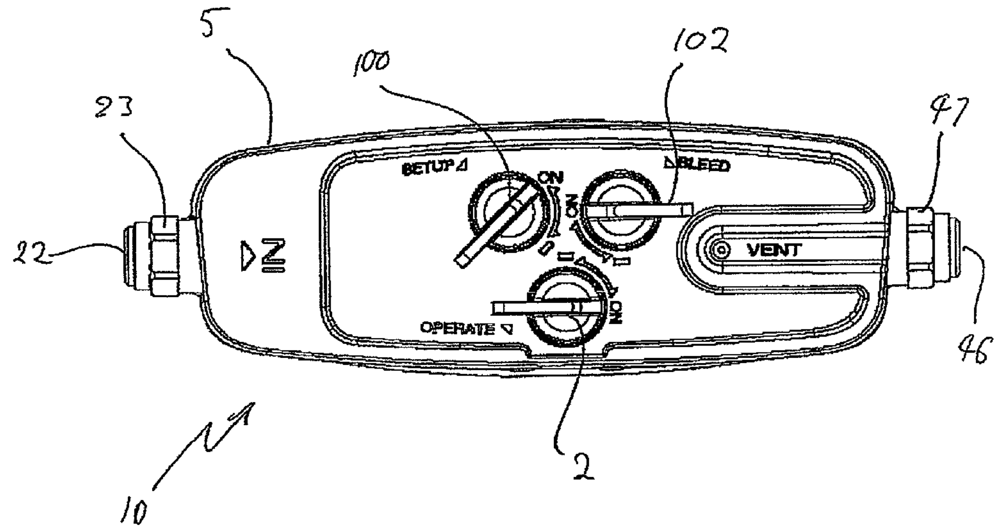
FIG. 3 illustrates a top view of the valve assembly of FIG. 1 and, in particular, spigots for operating the valve assembly.
Figure 4:
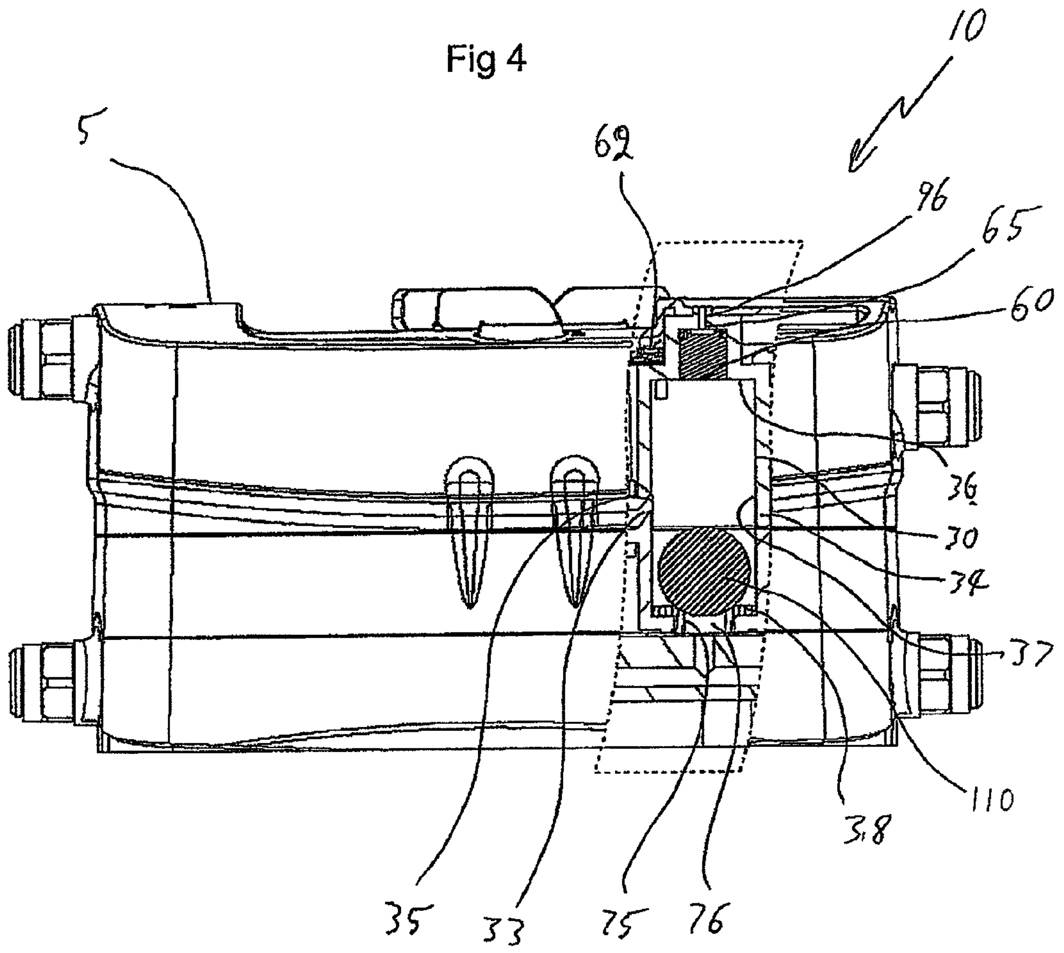
FIG. 4 illustrates a partial side section view of the valve assembly of FIG. 1 showing, in particular, a preferred form of the second valve including a closure in the form of a ball.
Figure 5:
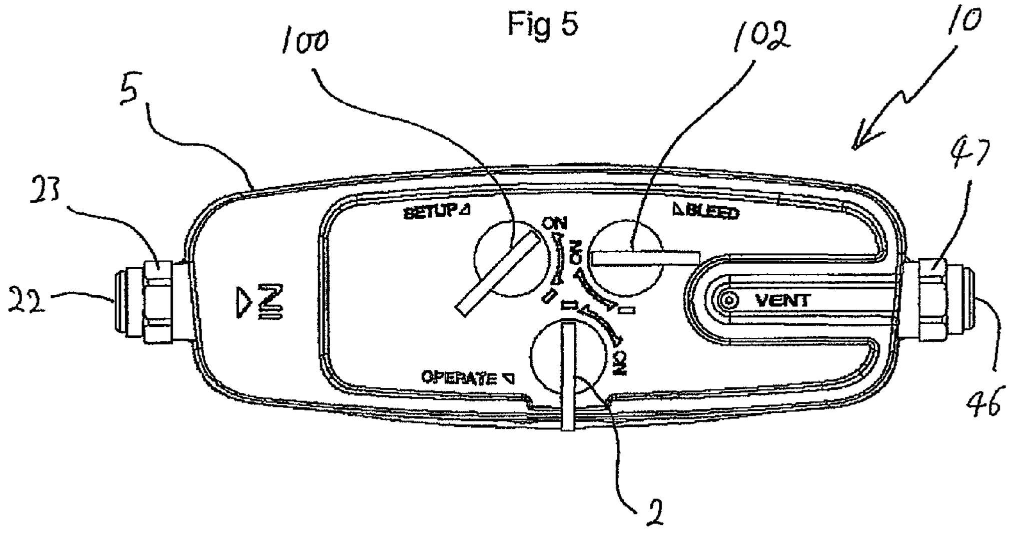
FIG. 5 illustrates a top view of the valve assembly of FIG. 1 with the spigots in a position for resetting the second valve.
Figure 6:
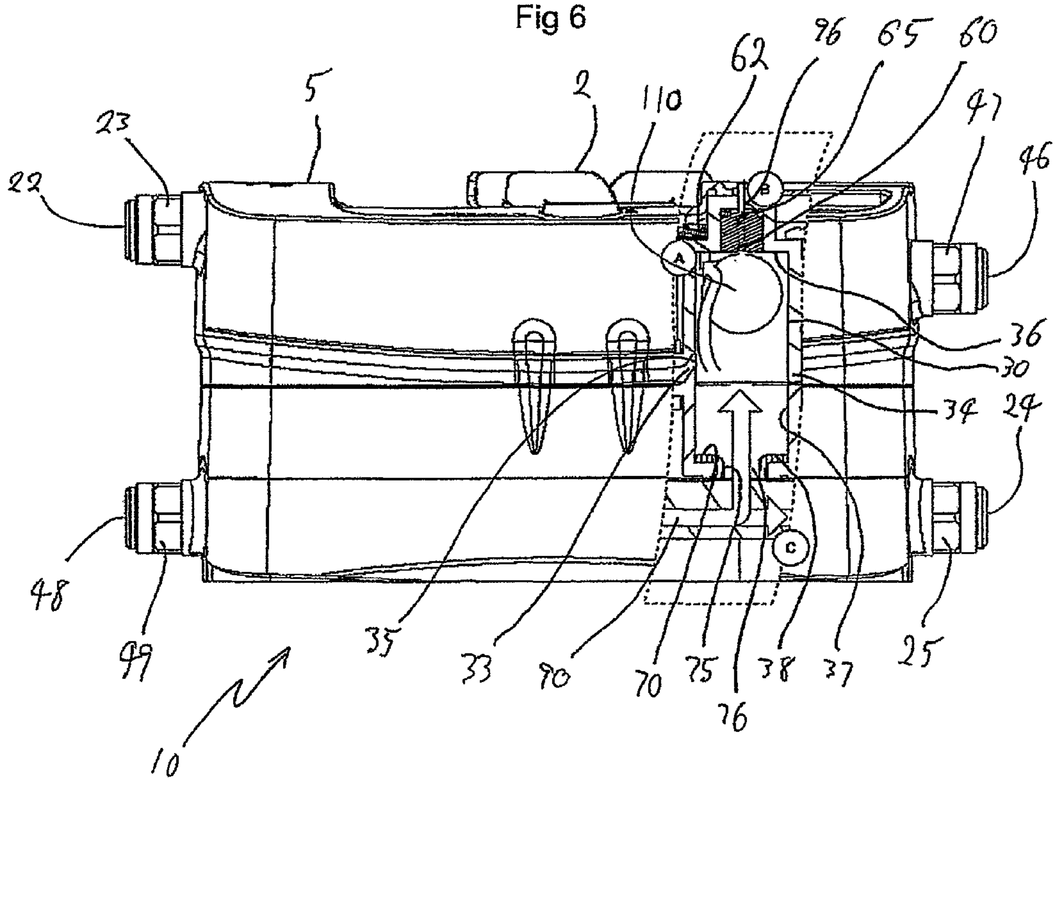
FIG. 6 illustrates a side section view of the valve assembly of FIG. 1 showing, in particular, resetting of the second valve.
Figure 7:
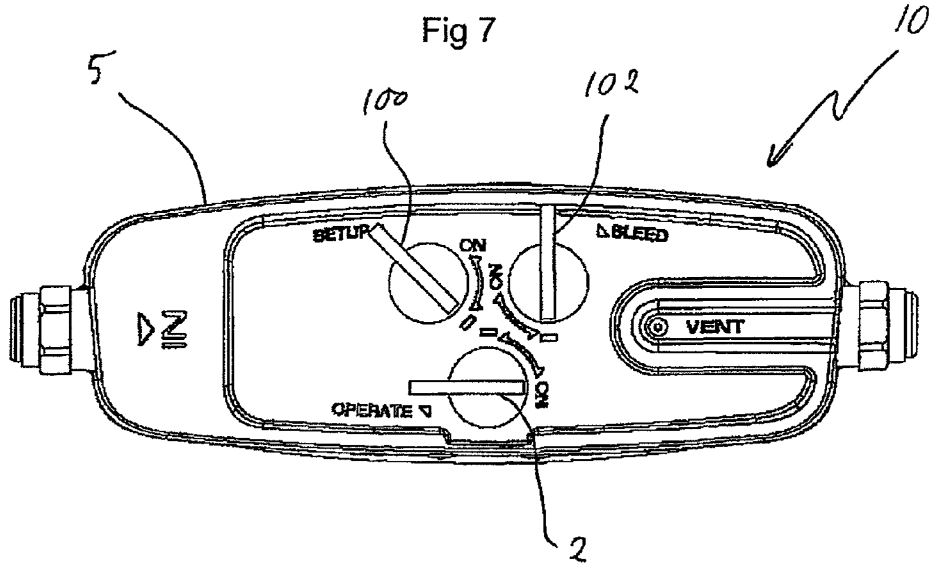
FIG. 7 illustrates a top view of the valve assembly of FIG. 1 with the spigots in a position associated with operation of the valve assembly.
Figure 8:
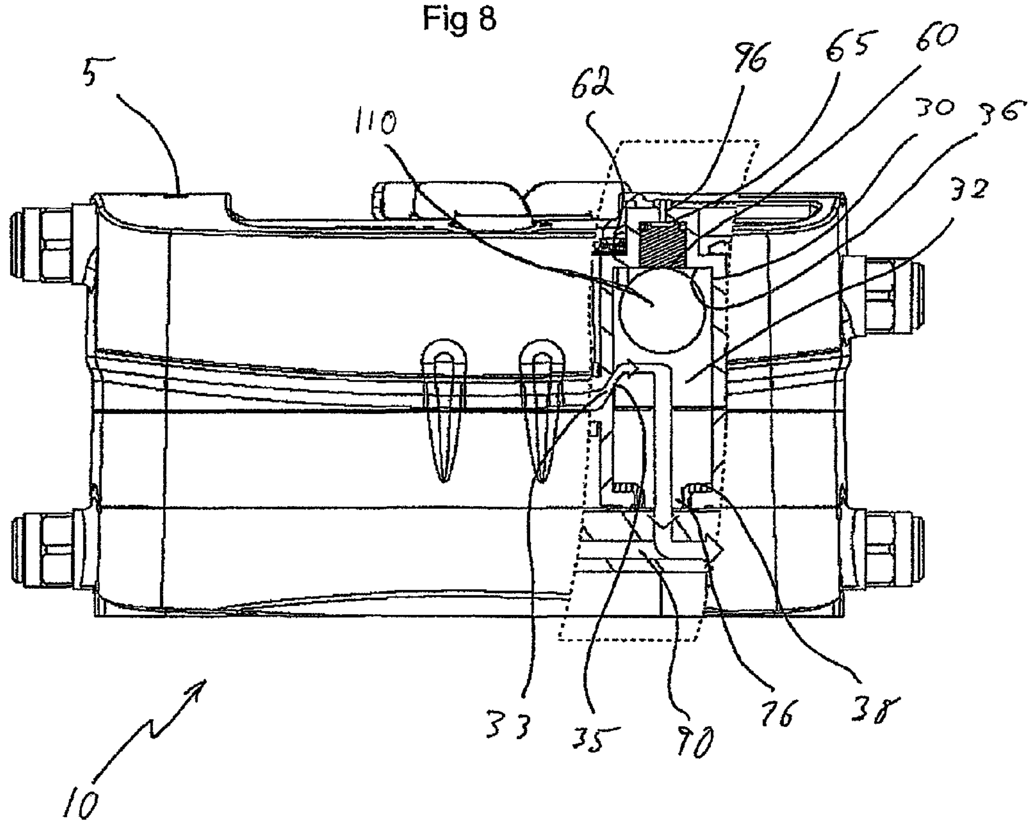
FIG. 8 illustrates a side section view of the valve assembly of FIG. 1 showing, in particular, water from a water source flowing through the first passage via the second valve and on to the water device.
Figure 9:
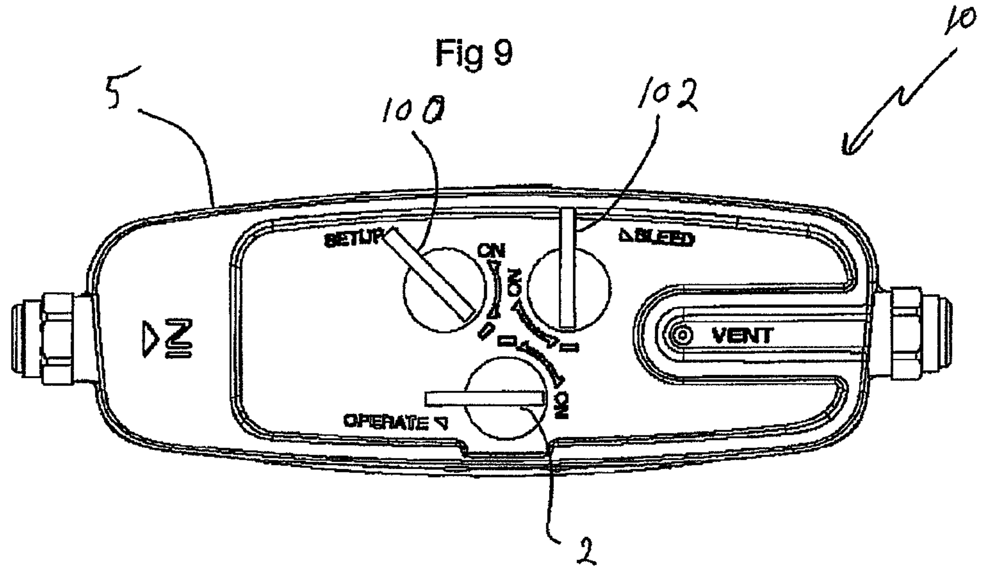
FIG. 9 illustrates a top view of the valve assembly of FIG. 1 with the spigots in a position associated with operation of the valve assembly.

Referring to FIGS. 1 to 12 there is shown a valve assembly 10 including a housing 5 having a first passage 20, a first valve 15 which is a shut-off valve, a second valve 30 which is a shut-down valve, a second passage 40 and a check valve 44. The first passage 20 is connected to a water device 50 which may be, for example, a water filtration device. Mains water flowing via the first passage 20 to the device 50 is filtered by the device 50 and returns to the valve assembly 10 through the second passage 40. The filtered water then flows through the check valve 44 in the second passage 40 before passing again through the first valve 15 in the second passage 40. After the filtered water passes through the first valve 15 in the second passage 40 the filtered water exits the second passage 40 of the assembly 10 for consumption or other use.

The first passage 20 begins at a first passage inlet 22 and terminates at a first passage outlet 24. The first passage inlet 22 has a fitting 23 which is adapted to couple with one end of a pipe 80 that is coupled at another end to a mains water supply outlet 85. Accordingly, mains water flows from the outlet 85 and into the first passage 20 via the pipe 80 and the first passage inlet 22. The mains water continues to flow via the first passage 20 to the first valve 15.

The first valve 15 is a twin chamber diaphragm shut-off valve. A first one of the chambers 16 is located in the first passage 20 and includes a diaphragm (not shown) that is subjected to the pressure of the water in the first passage 20 that has flowed from the mains water supply outlet 85 to the first chamber 16. When the water in the first passage 20 flows it passes through the first chamber 16 and continues through the first passage 20 to the second valve 30.

Figure 11:
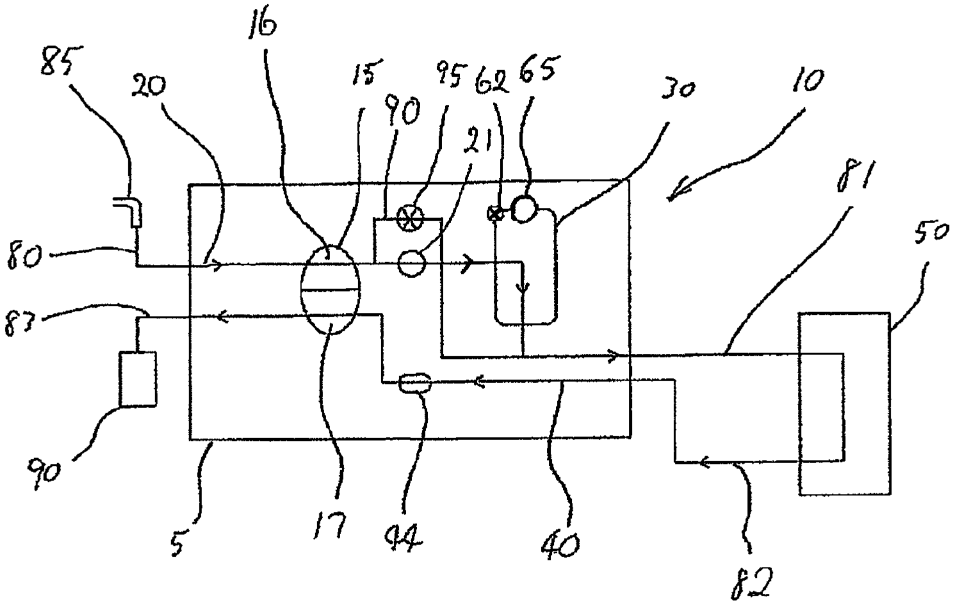
FIG. 11 illustrates a schematic plan of the valve assembly connected to a water device wherein the flow of water through the assembly in normal operation is illustrated.
Figure 12:
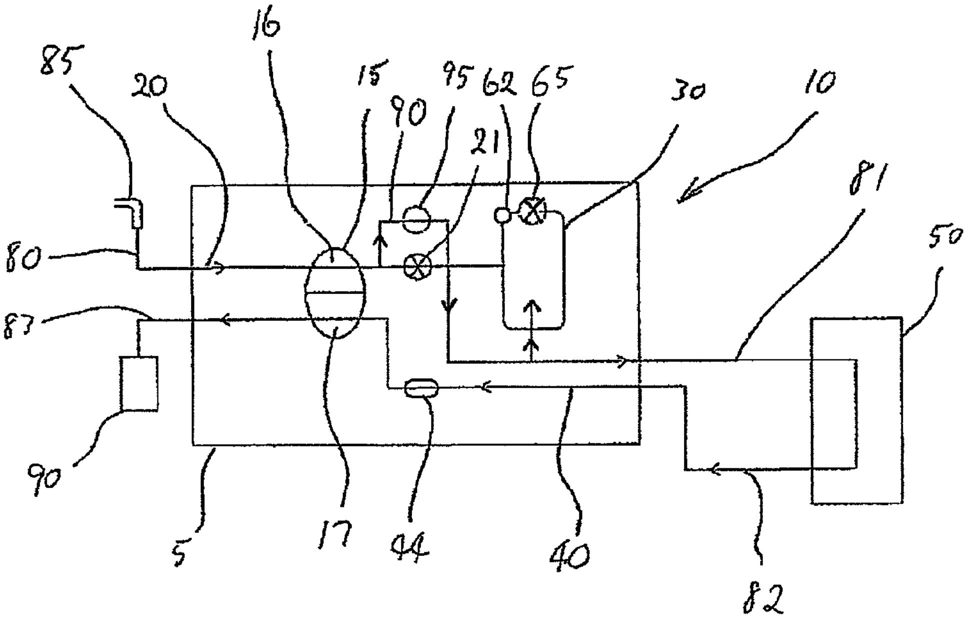
FIG. 12 illustrates a schematic plan of the valve assembly connected to a water device wherein the flow of water through the valve assembly while the second valve is being reset is illustrated.

However, between the first chamber 16 of the first valve 15 and the second valve 30 there is a selectively closable valve 21 in the first passage 20 that can be actuated by a user between an open position and a closed position for selectively allowing the mains water to flow from the first chamber 16 of the first valve 15 to a side opening 35 of the second valve 30. The valve 21 is connected to a spigot 2 mounted to the housing 5 which can be manipulated by a user to actuate the valve 21 between the open and closed positions. In FIG. 11 the valve 21 is in the open position wherein water is allowed to flow from the mains water supply outlet 85 and through the first passage 20. In FIG. 12 the valve 21 is in the closed position wherein water is prevented from flowing through the first passage 20.

As illustrated in FIGS. 4, 6, 8 and 10 the second valve 30 includes a cylindrical side wall 34 having a cylindrical internal surface 37 defining a hollow cylindrical volume 32. The cylindrical side wall 34 is capped at each end by a top 36 and a bottom 38. The top 36 is generally planar and circular and includes a centrally located opening 60 leading into an air inlet check valve 65 for allowing air to be drawn into the hollow volume 32 from the atmosphere external to the assembly 10. The top 36 also includes an air bleed valve 62 that is located at the periphery of the top 36 for bleeding air from the hollow volume 32 into the atmosphere external to the assembly 10. The bottom 38 of the second valve 30 includes an annular planar surface 70 that at its outer periphery is integral with the side wall 34 and at its inner periphery has an annular flange 75 depending downwardly therefrom. The annular flange 75 defines an bottom opening 76 in the bottom 38 of the hollow body 32.

In the embodiments illustrated in FIGS. 1 to 10 the second valve 30 includes a spherical ball 110 that is freely movable within the hollow volume 32 between the top 36 and the bottom 38. The ball 110 has a diameter that is slightly less than a diameter of the internal surface 37 of the side wall 34 of the second valve 30 so that the ball 110 may freely move within the hollow volume 32 between the top 36 and the bottom 38. The ball 110 is less dense than water so it is buoyant on water that enters the hollow volume 32 from beneath the ball 110.

At about a midpoint between the top 36 and the bottom 38 of the hollow volume 32 there is the side opening 35 in the side wall 34 between the internal surface 37 and a portion of the first passage 20 that extends between the side opening 35 and the first chamber 16 of the first valve 15. The side opening 35 has an upwardly inflected portion 33 immediately adjacent the side wall 34 that causes water flowing from the first valve 15 to the second valve 30 through the first passage 20 and the side opening 35 to be directed substantially upwardly inside the hollow volume 32 of the second valve 30. Thus, when the ball 110 is located substantially above the level of the side opening 35 the upwardly directed flow therefrom encounters the ball 110 from beneath and assists it to remain substantially above the level of the side opening 35. After encountering the ball 110 the flow circulates downwardly within the hollow volume 32 towards the bottom opening 76 in the bottom 38. The flow then exits the hollow volume 32 of the second valve 30 through the bottom opening 76 in the bottom 38.

The bottom opening 76 in the bottom 38 of the second valve 30 is connected to a portion of the first passage 20 that extends from the bottom opening 76 to the first passage outlet 24. The first passage outlet 24 has a fitting 25 that is adapted to couple with one end of a pipe 81 that has another end coupled to the water device 50, which may be a water filtration device or some other type of device which uses water such as a water heater. Thus, in the case where the water device 50 is a water filtration device water flows from the hollow volume 32 of the second valve to the water device 50 for filtration via the bottom opening 76 in the bottom 38 of the second valve 30, the first passage outlet 24 and the pipe 81.

The second passage 40 of the assembly 10 begins at a second passage inlet 46 and terminates at a second passage outlet 48. The second passage inlet 46 has a fitting 47 that is adapted to couple with an end of a pipe 82. Another end of the pipe 82 is coupled to the device 50. In the case where the water device 50 is a water filtration device, after the water flow is filtered by the device 50 it exits the device 50 via the pipe 82 and flows to the second passage inlet 46 and into the second passage 40 of the assembly 10. After entering the second passage 40, the filtered water flows through the check valve 44 in the second passage 40 before passing through a second chamber 17 of the first valve 15 that is located in the second passage 40. The second chamber 17 of the first valve 15 includes a diaphragm (not shown) that is subjected to the pressure of the water in the second passage 40. The filtered water then exits the second chamber 17 and finally exits the second passage 40 of the assembly 10 through the second passage outlet 48. The second passage outlet 48 has a fitting 49 that is adapted to couple with an end of a pipe 83. Another end of the pipe 83 may be coupled to a spigot or a water storage device 90 for consumption or other use.

As mentioned above, the first chamber 16 and the second chamber 17 of the first valve 15 are subjected to the pressure of the water in the first passage 20 and the pressure of the water in the second passage 40 respectively. The first valve 15 is also operable to mechanically obstruct the flow of water through the first chamber 16 in the first passage 20 in response to a reduction in pressure in the first passage 20 relative to the pressure in the second passage 40. Thus, where there is a water leak downstream of the first chamber 16 and upstream of the second chamber 17 of the first valve 15 such as in the water device 50 or in the pipes 81, 82 or fittings 25, 47 between the assembly 10 and the water device 50 then the first valve 15 detects a change in the pressure differential between the water in the first chamber 16 in the first passage 20 and the water in the second chamber 17 in the second passage 40. In response to sensing this change in pressure differential, the first valve 15 mechanically obstructs the first passage 20. By obstructing the first passage 20 the first valve 15 obstructs the flow of water through the first passage 20 from the mains water supply to the second valve 30. By obstructing the first passage 20 the first valve 15 at least temporarily prevents water from flowing into the hollow volume 32 through the side inlet 35 of the second valve 30.

The first valve 15 may obstruct the first passage 20 via any suitable means. In the present case, however, where the first valve 15 is a twin chamber, shut-off, diaphragm valve the diaphragm in the first chamber 16 is actuated by a stem (not shown) coupled to the diaphragm in the second chamber 17 whereby the reduction in pressure in the first passage 20 and, in turn, the first chamber 16 relative to the substantial maintenance of pressure in the second passage 40 and, in turn, the second chamber 17 causes the diaphragm in the second chamber 17 to actuate the stem that in turn actuates the diaphragm in the first chamber 16. When the diaphragm in the first chamber 16 is actuated it obstructs the first passage 20 and any water flow through the first chamber 16 by partially or fully blocking the first chamber 16. By obstructing the first passage 20 the diaphragm in the first chamber 16 prevents water from flowing into the hollow volume 32 through the side inlet 35 of the second valve 30.

In embodiments of the invention where the first valve 15 is a twin chamber, shut-off, diaphragm valve it is preferable to include the check valve 44, which is located in the second passage 40, between the second passage inlet 46 and the second chamber 17 of the first valve 15. If the check valve 44 is not positioned in the second passage 40 between the second passage inlet 46 and the second chamber 17 of the first valve 15 and a leak occurs upstream of the second chamber 17 then the pressure of water in the first chamber 16 in the first passage 20 and the pressure of the water in the second chamber 17 in the second passage 40 would tend to reduce by substantially equal amounts such that the first valve 15 may not detect a change in pressure differential therebetween. Thus, the first valve 15 may not react to a leak upstream of the second chamber 17 to partially or fully obstruct the first chamber 16 as described herein. The check valve 44, when included, will prevent the leak upstream of the second chamber 17 from causing a drop in pressure across the entire second passage 40. Accordingly, the drop in pressure in the third passage will occur in a portion of the second passage 40 upstream of the check valve 44 between the second passage inlet 46 and the check valve 44 and will not occur downstream of the check valve 44 between the check valve 44 and the second passage outlet 48. Thus, the portion of the second passage 46 between the check valve 44 and the second passage outlet 48, which includes the second chamber 17 of the first valve 15, will remain at a relatively higher pressure, as if unaffected by the leak. Thus, the pressure in the second chamber 17 will remain relatively higher compared to the pressure in the first chamber 16 of the first valve 15 which will drop in response to a leak upstream of the second chamber 17 for at least period of time sufficient for the first valve 15 to react to the leak to partially or fully block the first chamber 16 and obstruct the flow in the first passage 20 as described herein.

Figure 10:
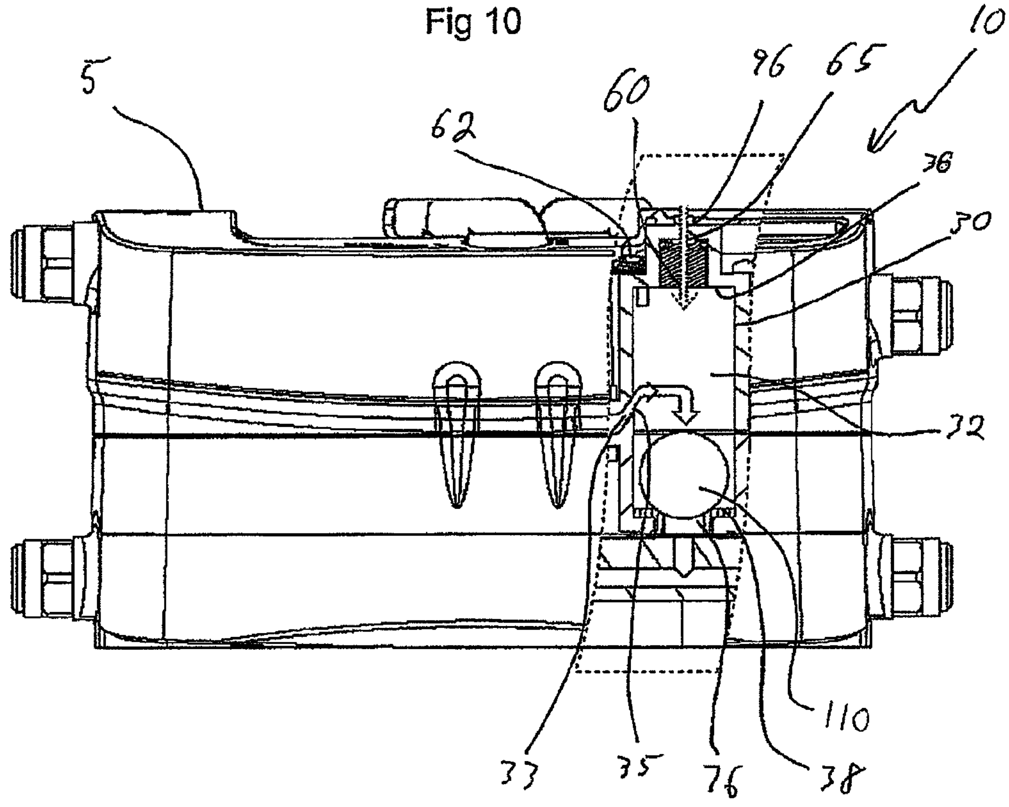
FIG. 10 illustrates a side section view of the valve assembly of FIG. 1 showing, in particular, the second valve in a closed position in response to an obstruction of water flow in the first passage from the first valve for stopping the flow to the water device.

A result of the first valve 15 partially or fully blocking the first chamber 16 and, in turn, obstructing the flow from the mains water supply outlet 85 to the second valve 30 is that the flow into the second valve 30 through the side opening 35 is reduced or substantially stopped, at least temporarily. The force of the upwardly directed flow from the side opening 35 into the hollow volume 32 is reduced as a result of the first valve 15 obstructing the flow from the mains water supply outlet 85 to the second valve 30 by partially or fully blocking the first chamber 16 to the extent that the upwardly directed flow from the side opening 35 and/or the level of water in the hollow volume 32 is insufficient to maintain the ball 110 above the level of the side opening 35. Also, during the period in which the flow into the second valve 30 is reduced or stopped any residual water in the second valve 30 will eventually drain from the second valve 30 via the bottom opening 76 in the bottom 38 of the second valve 30. The volume of water that drains out of the bottom opening 76 will drain out of the leak either in the water device 50 or in the pipes 81, 82 or fittings 25, 47 between the assembly 10 and the water device 50. As a result there is insufficient water remaining in the hollow volume 32 to maintain the buoyant ball 110 above the level of the side opening 35 of the second valve 30. This is particularly the case where the assembly 10 is located above the device 50 in which case the same volume of residual water in the hollow volume 32 drains out the leak due to gravity. In these circumstances, as illustrated in FIG. 10 the ball 110 drops substantially below the level of the side opening 35 and into sealing engagement with the bottom opening 76 in the bottom 38 of the second valve 30. This prevents any subsequent water which may enter the hollow volume 32 of the second valve through the side opening 35 from the first passage 20 from flowing through the bottom opening 76 and out the leak either in the water device 50 or in the pipes 81, 82 or fittings 25, 47 between the assembly 10 and the water device 50. In other words, the sealing engagement of the ball 110 with the bottom opening 76 closes the first passage 30 so as to stop the flow through the first passage 30 to the device 50 and restrict water loss from any leak downstream of the second valve 30 and upstream of the second chamber 17 of the first valve 15. Any residual flow from the side opening 35 into the hollow volume 32 as indicated by the arrow from the side opening 35 in FIG. 10 is prevented by the ball 110 from flowing through the bottom opening 76 in the bottom 38 and, in fact, provides a force against the ball 110 that enhances its sealing engagement with the bottom opening 76 in the bottom 38.

Thus, the assembly 10 is advantageous in that it provides a means of sensing a change in flow pressure differential, which may result from a leak downstream of the first chamber 16 and upstream of the second chamber 17 of the first valve 15 such as a leak in the device 50 or in the pipes 81, 82 or fittings 25, 47 between the assembly 10 and the water device 50. The assembly 10 also provides a means of stopping the flow of water from the mains water supply to the leaking device 50 or in the pipes 81, 82 or fittings 25, 47 between the assembly 10 and the water device 50 and so reduces the amount of water lost as a result of the leak. Another advantage of the assembly 10 is that it provides a means of reducing the amount of water lost due to a leak without requiring either sophisticated electronic pressure sensors or any electrical power for the operation thereof.

While the first valve 15 of the assembly 10 is effective for initially obstructing or even stopping the flow of water from the mains water supply to the leaking device 50, or pipes 81, 82 or fittings 25, 47 between the assembly 10 and the water device 50, it is to be appreciated that if the assembly did not include the second valve 30 then some time after a leak is suffered the initial change in pressure differential detected by the first valve 15 would reversed. As a result, the first valve 15 would detect the reversal of the change in pressures and this would cause the diaphragm in the second chamber 17 to actuate the stem and the diaphragm in the first chamber 16 so as to unblock the first chamber 16 and remove the obstruction such that the flow through the first passage 20 would resume. This would result in a resumption of the water leak and the loss of water therefrom as long as the valve 21 remains in the open position and allows the mains water to flow from the first passage inlet 22, via the first valve 15 to the second valve 30 and so on.

The air inlet check valve 65 is located in the top 36 of the second valve 30. One end 60 of the air inlet check valve 65 includes an opening in the top 36 of the second valve 30. Another end 96 of the air inlet check valve 65 bleed passage includes an opening to the atmosphere. The air inlet check valve 65 is operable for allowing air to enter the hollow volume 32 in response to the water draining out of the hollow volume 32 through the leak and the ball 110 dropping substantially below the level of the side opening 35 and into sealing engagement with the bottom opening 76 in the bottom 38 of the second valve 30. The allowance of air to enter the hollow volume 32 through the air inlet check valve 65 is illustrated by an arrow represented in broken lines through the air inlet check valve 65 in FIG. 10. By allowing air into the hollow volume 32, the air inlet check valve 65 prevents the formation of a vacuum between the surface of the water in the hollow volume and the top 36 of the second valve 30 which may otherwise prevent the water from draining out of the hollow volume 32 and the ball 110 from dropping into sealing engagement with the bottom opening 76 in the bottom 38. The air inlet check valve 65 also prevents any water from exiting the hollow volume 32 of the second valve 30 therethrough.

The closure of the first passage 20 by the second valve 30 can only be opened by resetting the second valve 30. Resetting the second valve 30 involves forcing the ball 110 upwards and out of sealing engagement with the bottom opening 76 in the bottom 38 of the second valve 30 and raising and maintaining the ball 110 substantially above the level of the side opening 35. As the ball 110 is less dense than water so it is buoyant on the surface of the water that enters the hollow volume 32 through the bottom opening 76. The flow of water through the first passage 30 and the side opening 35 into the hollow volume 32 and out the bottom opening 76 can be resumed because the ball 110 is maintained substantially above the level of the side opening 35. When the flow of water through the first passage 30 is resumed the volume of water in the hollow volume 32 is sufficient to maintain the buoyant ball 110 substantially above the level of the side opening 35.

In order to reset the second valve 30 the assembly 10 includes a third passage 90. The third passage 90 is connected at one end to the first passage 20 at a point between the first chamber 16 of the first valve 15 and the side opening 35 of the second valve 30. The third passage 90 is connected at another end to the bottom opening 76 in the bottom 38 of the second valve 30. The third passage 90 has a selectively closable valve 95 connected to a spigot 100 with which a user can actuate the valve 95 between a closed position and an open position. When the valve 95 is in the open position water may flow from the mains water supply outlet 85 and into the third passage 90 via the first chamber 16 of the first valve 15. The water flows out of the third passage 90 and through the bottom opening 76 into the hollow volume 32. This is possible because after the second valve 30 operates to block the first passage 20 the initial change in pressure differential as a result of the leak detected by the first valve 15 in the portion of the first passage containing the first chamber 16 and the portion of the second passage 40 containing the second chamber 17 would have reversed such that the first chamber 16 of the first valve 15 would have reopened to allow the flow of water therethrough.

The process of resetting the second valve 30 includes the initial step of closing the valve 21 in the first passage 20 between the first valve 15 and the second valve 30. This stops any flow of water through the first passage 20 and the side opening 35 into the hollow volume 32 so as to avoid any additional force on the ball 110 into sealing engagement with the bottom opening 76 in the bottom 38 of the second valve 30. Next the valve 95 in the third passage 90 is actuated into the open position so that water flows from the mains water supply outlet 85, via the first chamber 16 of the first valve 15 and the third passage 90, through the bottom opening 76 into the hollow volume 32 of the second valve 30 with sufficient pressure to overcome any downward pressure on the ball 110 and to raise the ball 110 upwardly above the level of the side opening 35. The ball 110 is less dense than water so it is buoyant on the surface of the water that enters the hollow volume 32 through the bottom opening 76.

During the resetting process, air that may have entered the second valve 30 during a period in which the second valve 30 was closed, through the air inlet check valve 65 or otherwise, is forced towards the top of the hollow volume 32 as water flows through the third passage 90 and into the hollow volume 32 to raise the ball 110 above the level of the side opening 35. This air may be bled from the second valve 30 via the bleed passage 62. The bleed passage 62 is located at the periphery of the top 36 of the second valve 30. The bleed passage 62 has a bleed valve 106 connected to a spigot 102 with which a user can actuate the bleed valve 106 between a closed position and an open position. Thus, when air is forced towards the top of the hollow volume 32 during the resetting process the bleed valve 106 can be actuated to the open position to bleed the air from the hollow volume 32. In use, the bleed valve 106 may be actuated to the closed position when substantially all air has been bled from the second valve 30. Without the bleed passage 62 and the bleed valve 106 water may be prevented from entering the hollow volume 32 through the bottom opening 76 and the ball 110 may be prevented from floating upwardly above the level of the side opening 35.

The final stage of the resetting process involves opening the valve 21 in the first passage 20 between the first valve 15 and the second valve 30 while the ball 110 remains above the level of the side opening 35. Thus, the flow through the first passage 20 into the hollow volume 32 of the second valve 30 via the first passage inlet 22, the first valve 15 and the side opening 35 is restored and directed substantially upwardly inside the hollow volume 32. The ball 110 is formed out of a material that is less dense than water so that the ball 110 remains above the level of the side opening 35 within the hollow volume 32 even when there is no movement of water through the first passage 20. The valve 95 in the third passage 90 can then be actuated to the closed position so that the flow into the hollow volume 32 through the bottom opening 76 in the bottom 38 ceases. After the resetting process is carried out as described above, the only flow that passes through the first passage 20 of the assembly is flow that passes through both the first valve 15 and the second valve 30. Thus, as a result of the resetting process the first valve 15 is brought back on line to be ready to obstruct flow in response to leaks and the second valve 30 is reset to be responsive to obstruction by the first valve 15.

The assembly 10 illustrated in FIGS. 1 to 12 and described above includes the check valve 44 in the second passage 40 between the second passage inlet 46 and the second chamber 17 of the first valve 15. However, the assembly may also incorporate one or more check valves (not shown) in the first passage 20 between the first passage inlet 22 and the first chamber 16 of the first valve 15. Alternatively, the one or more check valves may be located between the mains water supply outlet 85 and the first passage inlet 22 though these are not imperative to the invention. The inclusion of these one or more check valves in the assembly 10 can be required by regulation in some jurisdictions for the protection of the mains water supply from contamination. Accordingly, it is to be appreciated that forms of the assembly 10 with various numbers of check valves are foreseeable and may be considered to fall within the scope of the invention disclosed herein.

Figure 13:
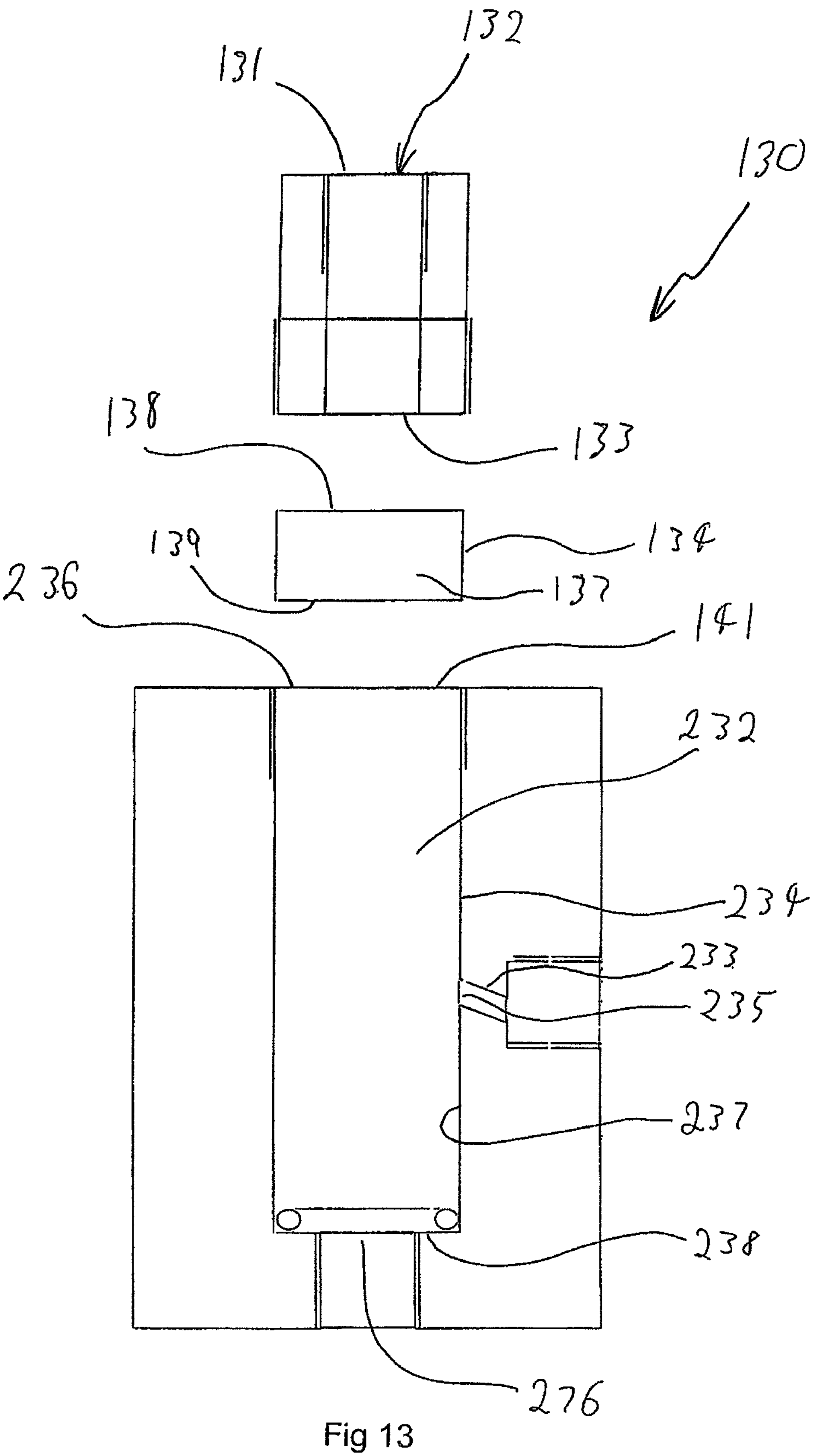
FIG. 13 illustrates an exploded schematic cross section view of an alternative form of the second valve including a closure in the form of a plug

In an alternative form of the second valve 130 illustrated in exploded form in FIG. 13, the assembly may include a top water inlet 132 instead of the air inlet check valve 65 and a closure in the form of a plug 134 instead of the ball 110 illustrated in FIGS. 1 to 10.

The plug 134 is a cylindrical member that is freely movable within the hollow volume 232 between the top 236 and the bottom 238. The plug 134 has a planar disc shaped top surface 138, a planar disc shaped bottom surface 139 and a cylindrical side surface 137 between the top surface 138 and the bottom surface 139. The plug 134 has a diameter that is slightly less than a diameter of the internal surface 237 of the side wall 234 of the second valve 130 so that the plug 134 may freely move within the hollow volume 232 between the top 236 and the bottom 238.

The top water inlet 132 of the embodiment of the second valve 130 illustrated in FIG. 13 functions in a similar manner to the air inlet check valve 65 of the embodiment illustrated in FIGS. 1 to 10. However, instead of allowing air to enter the hollow volume 32 in response to the ball 110 dropping substantially below the level of the side opening 35, as in the embodiment in FIGS. 1 to 10, in the embodiment illustrated in FIG. 13 the top water inlet 132 allows water to enter the hollow volume 232 in response to the plug 134 dropping substantially below the level of a side opening 235. The top water inlet 132 has an opening 133 at one end which fits into an opening 141 in the top 236 of the hollow volume 232. The top water inlet 132 has another opening 131 at another end which is in connected via a passageway (not shown) so that the opening 131 is in direct fluid communication with the water flow from the mains water supply outlet 85. Accordingly, the opening 131 of the top water inlet 132 may be connected via the passageway to the mains water supply outlet 85 directly or may be connected to a portion of the first passage 20 upstream of the first chamber 16 of the first valve 15. By allowing water into the hollow volume 232, the top water inlet 132 prevents the formation of a vacuum forming between the plug 134 and the top 236 of the second valve 130 which may otherwise prevent the plug 134 from dropping into sealing engagement with a bottom opening 276 in the bottom 238 of the hollow volume 232.

In the form of the second valve 130 illustrated in FIG. 13, the side opening 235 has an upwardly inflected portion 233 immediately adjacent the side wall 234 that causes water flowing from the first valve 15 to the second valve 130 through the first passage 20 and the side opening 235 to be directed substantially upwardly inside the hollow volume 232 of the second valve 130. Thus, when the plug 134 is located substantially above the level of the side opening 235 the upwardly directed flow therefrom encounters the plug 134 from beneath and assists it to remain substantially above the level of the side opening 235. After encountering the plug 134 the flow circulates downwardly within the hollow volume 232 towards the bottom opening 276 in the bottom 238 of the hollow volume 232. The flow then exits the hollow volume 232 of the second valve 130 through the bottom opening 276.

The plug 134 is a relatively close fit with the side wall 234 within the hollow volume 232 so that as long as water remains within a portion of the hollow volume 232 below the plug 134 then the plug 134 will remain above the level of the side opening 235. When the flow of water through the side inlet 235 is obstructed by the operation of the first valve 15 in response to detecting a leak in the water device 50 or in the pipes 81, 82 or fittings 25, 47 between the assembly 10 and the water device 50 the water within the portion of the hollow volume 232 below the plug 134 will drain out through the bottom opening 276 due to the leak. Because the plug 134 is a relatively close fit with the side wall 234 within the hollow volume 232 as the water in the portion of the hollow volume 232 below the plug 134 drains out through the bottom opening 276 the plug 134 is sucked down towards the bottom opening 276 and below the level of the side opening 235.

Accordingly, the assembly of the invention may overcome the problem of excessive water loss from water devices that suffer a leak either through a faulty connection between pipes or through a rupture in a component of the device itself. Furthermore, the assembly of the invention may overcome the above problem without requiring the use of electronic pressure sensors or other electronic leak detection means nor a power supply associated therewith.

Various alterations, modifications and/or additions may be introduced into the constructions and arrangements of parts previously described without departing from the spirit and/or ambit of the invention.

The claims defining the invention are as follows:

1. A valve assembly for reducing water loss from a leak from a water device, the valve assembly including:
- a first passage through which water flows from a water source to the water device;
  - a second passage through which water flows from the water device;
  - a first valve in fluid communication with the first passage and the second passage, wherein the first valve is operable for obstructing the first passage in response to a change in pressure differential between water in the first passage and water in the second passage resulting from a leak of water from the water device, and
  - a second valve in fluid communication with the first passage that is responsive to the obstruction of the first passage to close the first passage and thereby stop water from flowing from the water source to the water device.

2. The valve assembly of claim 1, wherein the second valve includes a hollow body and a first opening through which water flows into the hollow body, a second opening through which water flows out of the hollow body and a closure that is responsive to a reduction in the volume of water in the hollow body for closing the second opening.

3. The valve assembly of claim 2, wherein the reduction in volume of the water in the hollow body causes the closure to move from a position not between the first and second openings to a position between the first and second openings and into sealing engagement with the second opening thereby closing the second valve.

4. The valve assembly of claim 2, wherein the hollow body is cylindrical and has a top, a bottom and at least one side, the first opening being located in the side at a point intermediate the top and the bottom and the second opening being located in the bottom.

5. The valve assembly of claim 2, further including a third passage for water to flow from the water source and through the second opening of the second valve to reset the second valve by forcing the closure out of sealing engagement with the second opening and moving the closure from the position between the first and second openings to the position not between the first and second openings.

6. The valve assembly of claim 5, further including a resetting valve that is operable by a user for selectively allowing the flow into the hollow body through the third passage and the second opening.

7. The valve assembly of claim 2, further including a valve that is operable by a user for selectively allowing water to flow from the water source and into the hollow body of the second valve via the first opening.

8. The valve assembly of claim 1, further including an air inlet check valve for allowing air to enter the second valve and prevent a vacuum forming in the second valve when the second valve responds to the obstruction of the first passage to close the first passage.

9. The valve assembly of claim 1, further including a water inlet check valve for allowing water to enter the second valve and prevent a vacuum forming in the second valve when the second valve responds to the obstruction of the first passage to close the first passage.

10. The valve assembly of claim 1, further including a bleed passage for selectively bleeding air from the second valve.

11. The valve assembly of claim 10, further including a valve that is operable by a user for selectively opening the bleed passage.

12. The valve assembly of claim 1, wherein the first valve includes a first chamber in fluid communication with the first passage and a second chamber in fluid communication with the second passage.

13. The valve assembly of claim 12, wherein the first valve is operable for closing the first chamber in response to a change in pressure differential between water in the first chamber and water in the second chamber resulting from a leak suffered by the water device.

14. The valve assembly of claim 13, further including at least one check valve in the second passage upstream from the second chamber for maintaining the pressure of water in the second chamber when the water device suffers a leak.

15. The valve assembly of claim 1, wherein the first valve has at least one diaphragm for sensing the pressure of water in the first passage.

16. The valve assembly of claim 1, wherein the first valve has at least one diaphragm for sensing the pressure of water in the second passage.

17. The valve assembly of claim 1, wherein the assembly includes at least two check valves in the first passage or in the second passage.

18. The valve assembly of any one of claim 1, wherein the water device is a water filter.

19. The valve assembly of claim 1, wherein the valve assembly is encased within a housing.

20. A water filtration system including the valve assembly of claim 1, the water filtration system including a water filter for filtering water flowing from a water source through the first passage of the valve assembly and a water outlet to which filtered water flows from the filter through the second passage of the valve assembly.

21. The water filtration system of claim 20, wherein the water outlet is selectively openable for allowing water to flow from the water source to the water filter and to allow filtered water to flow from the water filter and out of the water outlet.

* * * * *